United States Patent [19]

Tomita

[11] Patent Number: 4,824,173
[45] Date of Patent: Apr. 25, 1989

[54] AUTOMOBILE REAR SEAT

[75] Inventor: Toshihiko Tomita, Hiroshima, Japan

[73] Assignee: Mazda Motor Corporation, Hiroshima, Japan

[21] Appl. No.: 895,824

[22] Filed: Aug. 12, 1986

[30] Foreign Application Priority Data

Aug. 23, 1985 [JP] Japan ................................ 60-185990

[51] Int. Cl.⁴ ............................................. A47C 4/02
[52] U.S. Cl. .................................... 297/443; 297/337; 297/378
[58] Field of Search ......... 297/452, 443, 344, DIG. 1, 297/337, 378, 330; 296/65 R

[56] References Cited

U.S. PATENT DOCUMENTS

| | | | |
|---|---|---|---|
| 2,019,159 | 10/1935 | Saunders | 297/344 X |
| 2,660,223 | 11/1953 | Appleton | 297/344 X |
| 2,784,769 | 3/1957 | Fisher | 297/443 X |
| 2,805,702 | 9/1957 | Appleton | 297/344 X |
| 2,815,067 | 12/1957 | Richardson | 297/443 |
| 3,475,054 | 10/1969 | Flint | 297/344 |
| 4,365,840 | 12/1982 | Kehl et al. | 297/443 |
| 4,395,071 | 7/1983 | Laird | 297/443 X |
| 4,621,784 | 11/1986 | Kaesling et al. | 297/344 X |

FOREIGN PATENT DOCUMENTS

| | | | |
|---|---|---|---|
| 991070 | 6/1976 | Canada | 297/443 |
| 60/89044 | 6/1985 | Japan . | |
| 60-125230 | 8/1985 | Japan . | |
| A2102284 | 2/1983 | United Kingdom | 297/443 |

Primary Examiner—Peter A. Aschenbrenner
Assistant Examiner—Thomas A. Rendos
Attorney, Agent, or Firm—Burns, Doane, Swecker & Mathis

[57] ABSTRACT

An automobile rear seat assembly which comprises a cushioning body, a base member for the support of the cushioning body and mounted on the base member for displacement in a direction parallel to the longitudinal sense of an automobile, a seat back pivotally mounted at a lower portion on the base member, a pair of spaced, telescopically extendable rail assemblies through which base member are mounted on a floor panel of the automobile for displacement in a direction parallel to the longitudinal sense of the automobile, and a plurality of guide members rigidly connected with one of the cushioning body and the base member while permitting the other of the cushioning body and the base member to be slidable relative to the guide members.

14 Claims, 3 Drawing Sheets

AUTOMOBILE REAR SEAT

BACKGROUND OF THE INVENTION

1. Field of the Invention

The present invention generally relates to an automobile rear seat assembly and, more particularly, to the facilitation of installation of the rear seat assembly within a passenger's compartment of an automobile.

2. Description of the Prior Art

Japanese Laid-open Utility Model Publication No. 60-89044, published June 18, 1985, discloses an automobile seat comprised of two separate seat assemblies juxtaposed with each other and adapted to be moved by a common drive motor independently of each other in a direction parallel to the longitudinal sense of the automobile. More specifically, each of the seat assemblies disclosed therein comprises a seat cushion and a seat back hinged to the seat cushion so as to assume a generally L-shaped configuration. Each seat assembly is mounted on an automobile floor panel inside the passenger's compartment through a pair of telescopically movable rail assemblies. Each of the rail assemblies comprises a carriage frame rigidly secured to the bottom of the seat cushion, and a rail slidably received in the carriage frame for movement lengthwise of and relative to the carriage frame and rigidly mounted on the floor panel.

Each of the carriage frames has a screw shaft rigidly connected at its opposite ends thereto so as to extend parallel thereto, said screw shaft having a nut member mounted thereon for movement axially of and relative to the screw shaft. The nut members on the respective screw shafts associated with one seat and the nut members on the respective screw shafts associated with the next adjacent seat are operatively coupled together with respective drive shafts which are adapted to be selectively engaged with the common drive motor.

For selectively engaging the drive shafts with the drive motor, use has been made of a solenoid-operated gear assembly.

Japanese Laid-open Utility Model Publication No. 60-125230, published Aug. 23, 1985, discloses a similar seat slide mechanism using a drive motor for each seat assembly. The drive motor used to move the seat assembly in a direction parallel to the longitudinal sense of the automobile is built in the seat cushion and, therefore, in this prior art reference, the screw shafts having the respective nut members movably mounted thereon are carried by the respective rails.

The seat slide mechanism disclosed in each of these prior art references is satisfactory in the sense that the position of the seat assembly relative to the steering wheel where the seat assembly in question is a front seat assembly, or relative to the front seat where the seat assembly in question is a rear seat assembly, can be adjusted in a sophisticated manner.

However, it has been found that difficulties are involved in installing the seat assembly on the floor panel inside the passenger's compartment. As is well known to those skilled in the art, the juxtaposed carriage frames are in practice secured to the bottom of the seat cushion through a generally square carrier frame. When it comes to the installation of the seat assembly on the floor panel, it is a general notion that the optimum working efficiency can be attained if the seat assembly in the form wherein the seat cushion and the seat back are hingedly connected together is carried into the passenger's compartment for installation on the floor panel.

However, the seat cushion and the seat back are bulky because of the employment of respectively foamed cushioning materials, with or without cushioning springs, which are necessitated to make the seat assembly as a whole comfortable to sit on. Therefore, when the seat back is folded against the seat cushion in readiness for the loading of the seat assembly into the passenger's compartment through the nearest door opening in the automobile body structure, it often happens that a rear end of a seat cushion interferes with a lower end of the seat back being then folded to such an extent that the seat assembly with the seat back in a folded position may not be loaded into the passenger's compartment without substantial difficulty. This is particularly true where the door opening in the automobile body structure is relatively small.

In view of the foregoing, it is a general practice to load the seat back, in the form as hinged to the carrier frame, into the passenger's compartment and then to secure the seat cushion to the carrier frame after the carrier frame has been mounted through the juxtaposed carriage frames on the respective rails rigid with the floor panel. Considering the automobile assembly line in which automobile body structures are successively conveyed onto a seat installing station, the separate loading of the seat back and the seat cushion poses a problem in that the work time at that work station tends to be prolonged because of the complicated and time-consuming procedures.

SUMMARY OF THE INVENTION

Accordingly, the present invention has been developed with a view to substantially eliminating the above discussed problems inherent in the prior art seat assemblies and has for its essential object to provide an improved seat assembly which can be folded to such a compact size as to permit it to be loaded into the passengers compartment with no substantial difficulty and in a quick and efficient manner with no need to separate the seat cushion and the seat back from each other.

In order to accomplish this object, the present invention provides an automobile rear seat assembly which comprises a cushioning body, a base member for the support of the cushioning body, said cushioning body being mounted on the base member for displacement in a direction parallel to the longitudinal sense of an automobile, a seat back pivotally mounted at a lower portion of the base member, a pair of spaced, telescopically extendable rail assemblies, said base member being mounted on a floor panel of the automobile through said rail assemblies for displacement in a direction parallel to the longitudinal sense of the automobile, and a plurality of guide members rigidly connected with one of the cushioning body and the base member while permitting the other of said cushioning body and the base member to be slidable relative to said guide members.

In this construction according to the present invention, the cushioning body can be displaceable relative to the base member in a direction parallel to the longitudinal sense of the automobile and, specifically, in a direction close towards and away from the seat back. When the seat back is to be folded down against the seat body, the seat body is displaced away from the seat back without being detached from the base member and, therefore, the seat assembly as a whole can be folded to a size compact enough to permit it to be quickly and efficiently loaded into the passenger's compartment for the installation therein.

After the installation, the seat body is slid backwards close towards the seat back and is then firmly fastened to the base member.

BRIEF DESCRIPTION OF THE DRAWINGS

This and other objects and features of the present invention will become clear from the following description taken in conjunction with a preferred embodiment thereof with reference to the accompanying drawings, in which.

DETAILED DESCRIPTION OF THE EMBODIMENT

Figure 1:
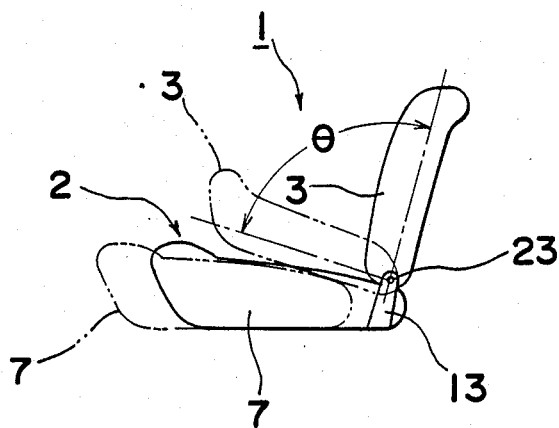
FIG. 1 is a schematic side view of an automobile rear seat assembly.

Before the description of the present invention proceeds, it is to be noted that like parts are designated by like reference numerals throughout the accompanying drawings.

Figure 2:
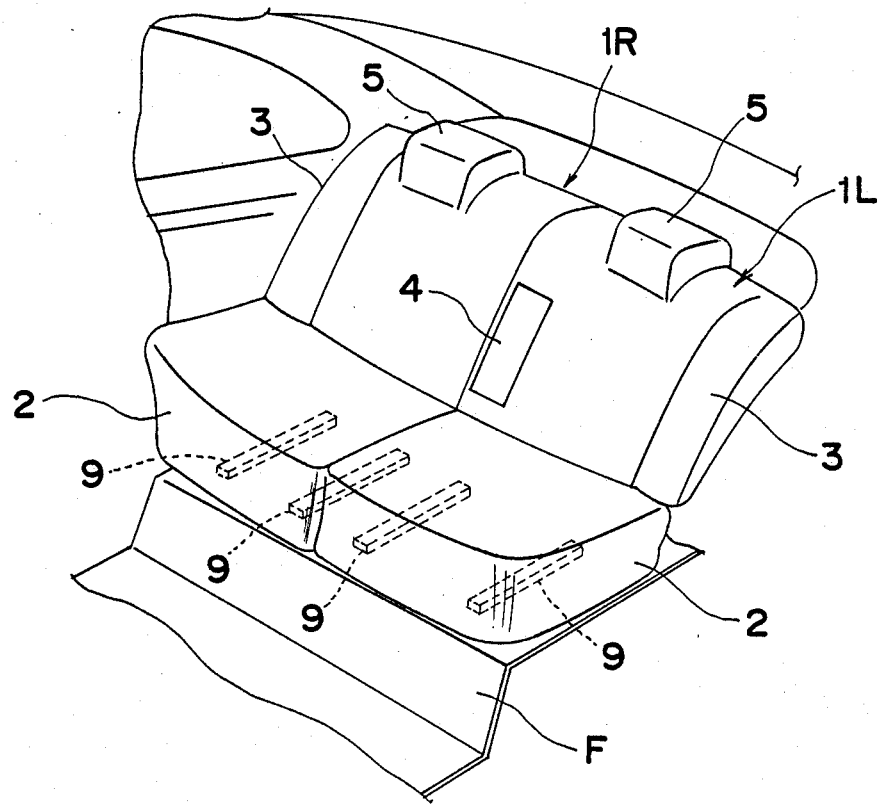
FIG. 2 is a perspective view of the rear seat assemblies juxtaposed to complete an automobile rear seat.

Referring first to FIGS. 1 and 2, an automobile rear seat shown therein and generally identified by 1 is of a separate type comprised of a right-hand rear seat assembly 1R and a left-hand rear seat assembly 1L as viewed in a direction frontwardly of the automobile, which are installed in side-by-side relationship within a passenger's compartment of the automobile. Each of the rear seat assemblies 1R and 1L comprises a seat cushion 2 and a seat back 3, the seat back 3 having a respective head rest 5 formed therewith or fitted thereto. Except that one of the seat assemblies, for example, the left-hand rear seat assembly 1L is provided with a foldable center arm rest 4 foldably built in the associated seat back 3, the right-hand and left-hand rear seat assemblies 1R and 1L are generally of an identical construction and, therefore, for the sake of brevity, reference will be hereinafter made to only one of them, for example, the left-hand rear seat assembly 1L in describing the details of the present invention.

Figure 3:
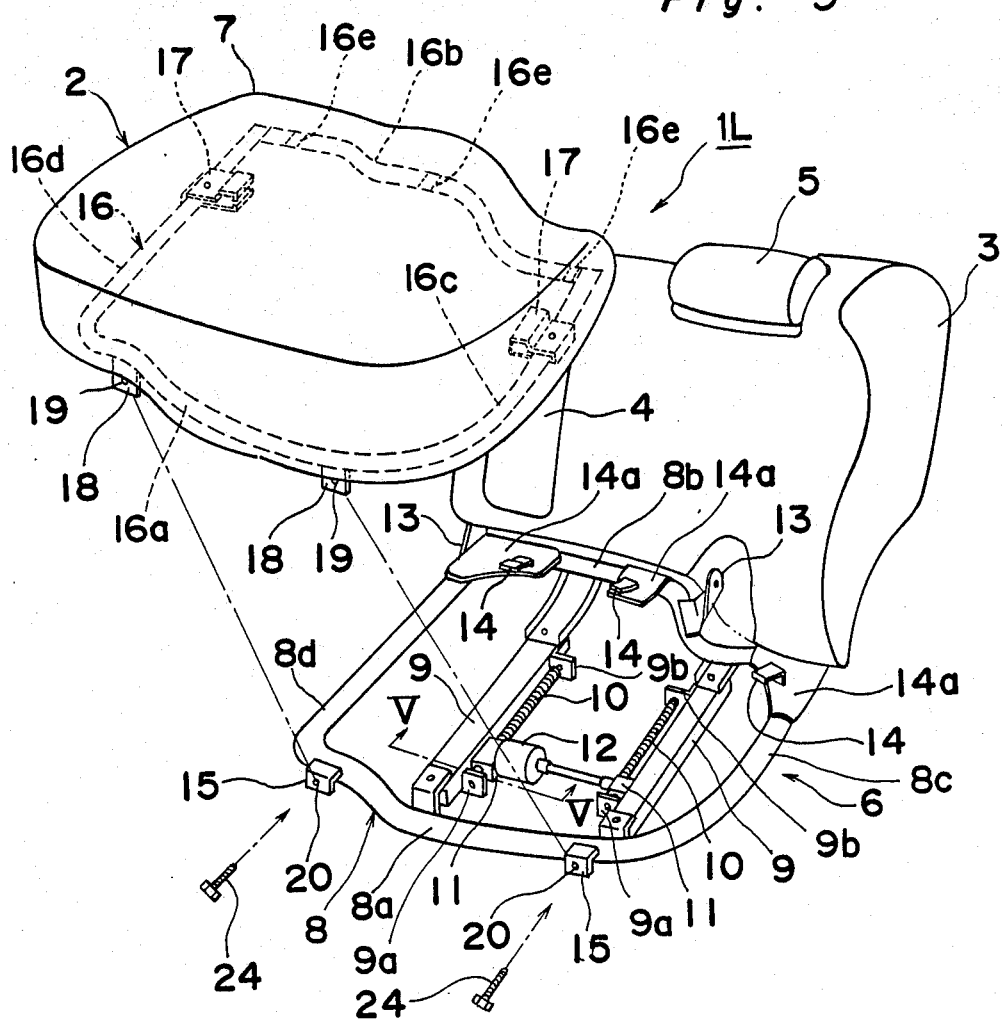
FIG. 3 is an exploded view of the rear seat assembly.
Figure 4:
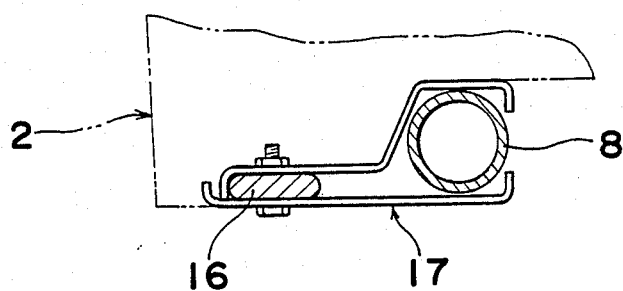
FIG. 4 is a transverse sectional view, on an enlarged scale, of a portion of the rear seat assembly showing the connection between a base member and a seat cushion.
Figure 5:
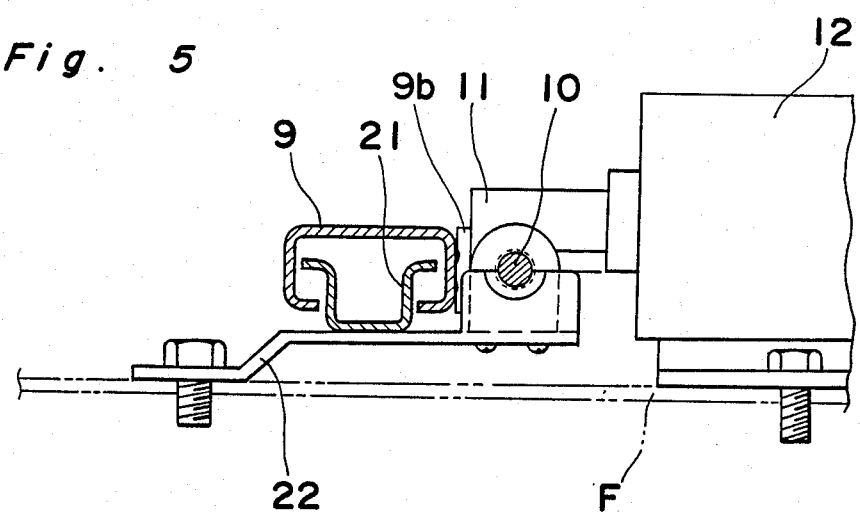
FIG. 5 is a cross-sectional view, on an enlarged scale, taken along the line V—V in FIG. 3.

Referring now to FIGS. 3 to 5, the seat cushion 2 comprises a base member 6 mounted on an automobile floor panel F for adjustable sliding movement in a direction parallel to the longitudinal sense of the automobile in a manner as will be described later, and a cushioning body 7 comprised of a cushioning layer and a cushion support frame 16 embedded in the cushioning layer and partially exposed to the outside from the bottom of the cushioning layer. The base member 6 comprises a tubular carrier frame 8 so shaped into a generally square contour as to have front and rear frame portions 8a and 8b and a pair of side frame portions 8c and 8d, and a pair of spaced rail member in the form of carriage frames 9 rigidly connected at their opposite ends to the front and rear frame portions 8a and 8b and extending in spaced relation to each other in a direction parallel to the longitudinal sense of the automobile.

The cushion support frame 16 has a shape similar to, but undersized relative to, the contour of the cushioning layer and is, therefore, comprised of front and rear frame portions 16a and 16b and a pair of side frame portions 16c and 16d. This cushion support frame 16 is also similar in shape to the tubular carrier frame 8, but is so oversized relative to the carrier frame 8 that only the frame portions 16a, 16c and 16d of the cushion support frame 16 could be situated exteriorly of the associated frame portions 8a, 8c and 8d of the carrier frame 8. The cushion support frame 16 also has a plurality of, for example, two, guide members 17 firmly fastened to the respective side frame portions 16c and 16d, which guide members 17, when the cushioning body 7 is mounted on the base member 6, relatively slidably clamp the associated side frame portions 8c and 8b in a manner as shown in FIG. 4. Thus, the cushioning body 7 is slidable along the side frame portions 8c and 8d relative to the base member 6.

One or more, for example, two, depending lugs 18 each having a through-hole 19 defined therein for the free passage of a respective set bolt 24 are welded to, or integrally formed with, the front frame portion 16a of the cushion support frame 16. Cooperable with these depending lugs 18 are brackets 15 welded to the front frame portion 8a of the carrier frame 8 and positioned in alignment with the respective depending lugs 18, each of said brackets 15 having a threaded hole 20 defined therein for receiving the associated set bolt 24 which has been freely passed through the through-hole 19 in the respective depending lug 18.

Figure 6:
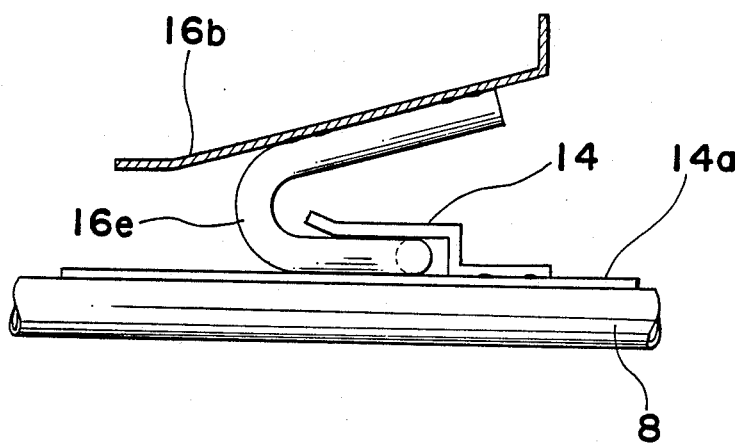
FIG. 6 is a side sectional view, on an enlarged scale, showing the connection between a cushion frame and the base member.

The rear frame portion 16b of the cushion support frame 16 has a plurality of, for example, three, generally U-shaped anchor plates 16e welded thereto in spaced relation to each other over the length of the rear frame portion 16b so as to open in a direction away from the front frame portion 16a. These anchor plates 16e are engageable, generally in a shake-hand fashion as best shown in FIG. 6, with respective catches 14, welded to respective fixtures 14a which are in turn rigidly mounted on, or otherwise welded to, the rear frame portion 8b of the carrier frame 8, when the cushioning body 7 is slid backwards with the guide members 17 moving along the side frame portions 8c and 8d. The engagement in a generally shake-hand fashion between the anchor plates 16e and the catches 14 is effective to suppress any possible rise of the cushioning body 7, particularly a rear portion of the cushioning body 7 adjacent the seat back 3.

The rear frame portion 8b has a pair of spaced, generally upright brackets 13 rigidly secured or otherwise welded thereto, to which brackets is pivotally connected a lower portion of the seat back 3 by means of respective pin members 23 (FIG. 1).

Each of the carriage frames 9 is, as best shown in FIG. 5, of a generally C-shaped cross-section opening downwardly towards the floor panel F. The base member 6 including the carrier frame 8 and the carriage frames 9 is mounted on respective rails 21 for movement in a direction parallel to the longitudinal sense of the automobile along the rails 21. These rails 21 are fixedly mounted on the floor panel F through respective rigid support strips 22 one for each rail 21 secured to the floor panel F as shown in FIG. 5, each of said rails 21 representing a cross sectional shape generally similar to the inverted shape of a figure "Ω". As best shown in FIG. 5, when the base member 6 is so mounted on the rails 21, portions of the rails 21 adjacent their respective openings are received inside the associated carriage frames 9 so that the carriage frames 9 can telescopically slide relative to and along the rails 21.

The seat assembly 1L also comprises a seat slide mechanism for adjustably driving the seat assembly 1L in a direction towards and away from an automobile front seat (not shown). This slide mechanism comprises screw shafts 10 rigidly secured at their opposite ends to the associated carriage frames 9 in spaced and parallel relation thereto through respective pairs of brackets 9a and 9b, nuts 11 threadingly mounted on the respective screw shafts 10, and a drive motor 12 rigidly mounted on the floor panel F and of a type having its drive shaft with its opposite ends protruding outwards form the motor casing in opposite directions away from each other, said opposite ends of said motor drive shaft being in turn drivingly coupled with the respective nuts 11. It is to be noted that a combination of each nut 11 with the associated screw shaft may constitute any known ball-screw assembly. Alternatively, each nut 11 may have its outer periphery formed with a plurality of circumferentially equally spaced teeth while the associated end of the drive shaft of the motor 12 may be formed into a worm gear engageable with the teeth on the nut 11. In the latter case, the nuts 11 must be held in position without being displaced along the respective screw shafts 10 and this can be accomplished by, for example, the use of brackets rigidly mounted on the associated support strips 22 for rotatably supporting the respective nuts 11 while permitting the loose passage of the screw shafts 10 therethrough. Furthermore, as a third alternative, instead of the use of the nuts 11, the opposite ends of the drive shaft of the motor 12 may have respective spur gears rigidly mounted thereon for engagement with the associated screw shafts 10.

The slide mechanism of the construction described above is so designed that, when the motor 12 is driven, the base member 8, and hence, the seat assembly 1L as a whole, can be moved in a direction close towards and away from the front seat, the position of the seat assembly 1L relative to the front seat being fixed when the supply of an electric power to the motor 12 is interrupted at the instant the seat assembly 1L is moved to such position.

While the seat assembly 1L is constructed as hereinbefore fully described, the cushioning body 7 including the support frame 16 can be fixed in position relative to the base member 6 when the set bolts 24 freely passing through the through-holes 19 in the lugs 18 fast or integral with the support frame 16 are firmly fastened to the brackets 15, i.e., firmly threaded into the threaded holes 20 in the brackets 15, respectively. The fastening of the set bolts 24 is carried out as the last step of installation of the seat assembly inside the passenger's compartment of the automobile as will now be described.

Assuming that the automobile body structure being conveyed through an automobile assembly line is, after the rails 21 and the motor 12 have been secured to the floor panel F in the manner as hereinbefore described, brought to the work station at which the rear seat is to be installed, each seat assembly, for example, the left-hand rear seat assembly 1L, is brought into the passenger's compartment through the adjacent door opening on the body structure while the seat back 3 is laid down, or folded, against the seat cushion 2, as shown by the phantom line in FIG. 1, about a common axis aligned with the pivot pins 23. In this folded condition, the set bolts 24 have not yet been fastened to connect the lugs 18 with the brackets 15, and the cushioning body 7 is slid forwards in a direction away from the seat back 3 along the side frame portions 8c and 8d of the carrier frame 8 so that a rear portion of the seat cushion 2 will not substantially interfere with a lower portion of the seat back 3, that is, a rear portion of the cushioning body 7 will not provide a substantial obstruction to the folding of the seat back 3. In other words, the angle $\theta$ through which the seat back 3 can be folded about the common axis aligned with the pivot pins 23, shown in FIG. 1, can be maximized to minimize the bulkiness of the seat assembly in the folded condition.

According to the present invention, therefore, the cushioning body 7 need not be separated from the base member 6 and the seat back 3 at the time the seat assembly is desired to be brought into the passenger's compartment.

After the seat assembly in the folded condition as shown by the phantom line in FIG. 1 has been brought into the passenger's compartment, the carriage frames 9 are passed over the respective rails 21, and the seat back 3 is then erected to assume a position shown by the solid line in FIG. 1. After the erection of the seat back, the cushioning body 7 is pushed rearwardly in a direction close towards the seat back 3 until the anchor plates 16e rigid with the cushion support frame 16 are snugly caught by the catches 14 as best shown in FIG. 6. The final procedure is to fasten the lugs 18 together with the brackets 15 by threading the set bolts 24 in the manner as hereinbefore described to lock the cushioning body 7 in position as mounted on the base member 6.

Figure 7:
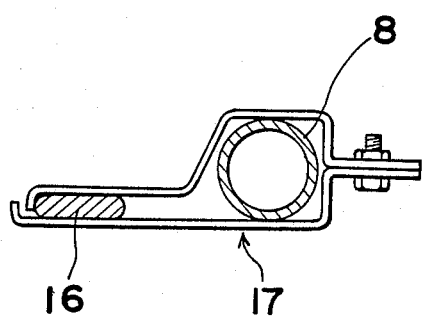
FIG. 7 is a view similar to FIG. 4, showing a modification thereof.

Although the present invention has been described in connection with the preferred embodiment with reference to the accompanying drawings, it is to be noted that various modifications are apparent to those skilled in the art. By way of example, although in the illustrated embodiment the guide members 17 have been shown and described as rigidly secured to the opposite side frame portions 16c and 16d of the support frame 16, they may be rigidly secured or clamped to the opposite frame portions 8c and 8d of the carrier frame 8, respectively, as shown in FIG. 7 so that the opposite side frame portions 16c and 16d of the support frame 16 can be slidably clamped thereby. Accordingly, such changes and modifications are to be understood as included within the scope of the present invention as defined by the appended claims unless they depart therefrom.

What is claimed is:

1. An automobile rear seat assembly comprising:
    a pair of first rail members mounted on a floor panel of the automobile,
    a base member including a pair of second rail members slidably mounted on the pair of first rail members for displacement relative thereto in a front-to-rear direction parallel to the longitudinal sense of the automobile for adjustment of the base in that direction,
    a seat back including a lower portion mounted to a rear side of the base member by a pivot connection so that the seat back is pivotable downwardly toward the base member,
    a cushioning body mounted on the base member, a plurality of guide members rigidly connected to one of the cushioning body and base member and movable relative to the other of the cushioning body and base member in a front-to-rear direction parallel to the longitudinal sense of the automobile to permit the cushioning body to be displaced relative to the base member forwardly away from the pivot connection to enhance the extent to which the seat back can be pivoted toward the base member in order to facilitate the introduction of the seat assembly into the automobile, and restricting means detachably connectible between the cushioning body and the base member for restricting the displacement of the cushioning body relative to the base member.

2. The assembly as claimed in claim 1, wherein said base member comprises a carrier frame member so shaped as to follow the contour of the cushioning body, and wherein the cushioning body includes a support frame member so shaped as to follow the contour of the cushioning body and fitted to the bottom of the cushioning body.

3. The assembly as claimed in claim 2, wherein said guide members connect the carrier frame member and said support frame member together.

4. The assembly as claimed in claim 3, wherein said guide members are rigidly secured at one end to the support frame member and relatively slidably connected at the other end with the carrier frame member.

5. The assembly as claimed in claim 3, wherein said guide members are rigidly secured at one end to the carrier frame member and relatively slidably connected at the other end with the support frame member.

6. The assembly as claimed in claim 2, further comprising a plurality of catch means provided on a rear frame portion of the carrier frame member for engagement with a rear frame portion of the support frame member thereby to avoid any possible rise of a rear portion of the cushioning body from the base member.

7. The assembly as claimed in claim 2, wherein said carrier frame member is a tubular frame.

8. The assembly as claimed in claim 1, wherein the second rail members comprise carriage frames telescopingly slidable on the first rail members.

9. The assembly as claimed in claim 8 further comprising a screw shaft having its opposite ends rigidly secured to each of the carriage frames in spaced parallel relationship thereto, said screw shaft adapted to be relatively driven by a motor to displace the base member in said direction parallel to the longitudinal sense of the automobile.

10. The assembly as claimed in claim 1, wherein the restricting means comprises a plurality of bolt members disposed at a front side of the seat assembly for securing the cushioning body immovably to the base member.

11. The assembly as claimed in claim 1, wherein the base member includes a carrier frame member, and the cushioning body includes a support frame member slidably supported on portions of the carrier frame member, said portions of the carrier frame member being disposed beneath the cushioning body.

12. An automobile rear seat assembly comprising:
a pair of first rail members mounted on a floor panel of the automobile,
a base member including a pair of second rail members slidably mounted on the pair of first rail members for displacement relative thereto in a front-to-rear direction parallel to the longitudinal sense of the automobile for adjustment of the base in that direction,
a seat back including a lower portion mounted to a rear side of the base member by a pivot connection so that the seat back is pivotable downwardly toward the base member,
a cushioning body mounted on the base member,
a plurality of guide members rigidly connected to one of the cushioning body and base member and movable relative to the other of the cushioning body and base member in a front-to-rear direction parallel to the longitudinal sense of the automobile to permit the cushioning body to be displaced relative to the base member forwardly away from the pivot connection to enhance the extent to which the seat back can be pivoted toward the base member in order to facilitate the introduction of the seat assembly into the automobile,
the base member comprising a carrier frame member shaped to follow the contour of the cushioning body, and the cushioning body including a support frame member shaped to follow the contour of the cushioning body and fitted to the bottom of the cushioning body, and
catch means provided on a rear portion of the carrier frame member for engagement with a rear portion of the support frame member only when the cushioning body is displaced rearwardly relative to the base member in order to resist any possible rise of a rear portion of the cushioning body from the base member.

13. The assembly as claimed in claim 12, wherein the second rail members comprise carriage frames telescopingly mounted on the first rail members.

14. The assembly as claimed in claim 12 further comprising a screw shaft having its opposite ends rigidly secured to each of the carriage frames in spaced parallel relationship thereto, the screw shaft adapted to be relatively driven by a motor to displace the base member in said direction parallel to the longitudinal sense of the automobile.

* * * * *